United States Patent
Critchley et al.

[11] Patent Number: 5,927,868
[45] Date of Patent: Jul. 27, 1999

[54] THRUST BEARING ASSEMBLY WITH MISASSEMBLY TAB

[75] Inventors: Paul W. Critchley, Torrington; Thomas G. Rhoads, Thomaston, both of Conn.

[73] Assignee: The Torrington Company, Torrington, Conn.

[21] Appl. No.: 09/200,511

[22] Filed: Nov. 25, 1998

Related U.S. Application Data

[60] Provisional application No. 60/068,224, Dec. 19, 1997.

[51] Int. Cl.$^6$ ............................................. F16C 19/30
[52] U.S. Cl. ........................... 384/606; 384/620; 384/621
[58] Field of Search ..................................... 384/606, 621, 384/622, 620, 618

[56] References Cited

U.S. PATENT DOCUMENTS

| | | |
|---|---|---|
| 4,042,309 | 8/1977 | Hiraga . |
| 4,310,205 | 1/1982 | Condon, Jr. et al. . |
| 4,733,979 | 3/1988 | Tsuruki . |
| 4,783,183 | 11/1988 | Gardella . |
| 4,907,899 | 3/1990 | Rhoads . |
| 4,934,842 | 6/1990 | Premiski et al. . |
| 5,110,223 | 5/1992 | Koch et al. . |
| 5,474,390 | 12/1995 | Rhoads . |
| 5,647,675 | 7/1997 | Metten et al. . |

*Primary Examiner*—Lenard A. Footland
*Attorney, Agent, or Firm*—John C. Bigler

[57] ABSTRACT

Rolling elements are positioned between two thrust washers that are retained together as an assembly. One of the thrust washers has one or more one-way assembly tabs extending radially outwardly beyond the axially extending lip of the other thrust washer to provide an interference with a housing to prevent the thrust bearing assembly from being installed on the pilot surface of the housing "backwards". A remaining perimeter portion of the thrust washer adjacent to the one-way assembly tabs has a maximum radius less than the radius of the axially extending lip of the first thrust washer to facilitate flow of lubricant.

6 Claims, 1 Drawing Sheet

5,927,868

THRUST BEARING ASSEMBLY WITH MISASSEMBLY TAB

This application claims benefit of provisional application Ser. No. 60/068,224 filed Dec. 19, 1997.

BACKGROUND OF THE INVENTION

This invention relates generally to thrust bearing assemblies with rolling elements and, more particularly, to thrust bearing assemblies that must be installed in a particular orientation.

Generally, thrust bearing assemblies with rolling elements include two axially spaced thrust washers separated by the rolling elements, held together as an assembly. The two thrust washers are not identical, typically, and many applications require such thrust bearing assemblies to be installed with a particular one of the two thrust washers against a respective mating surface. That is, assembly of the transmission or other device requires installation of the thrust washer assembly in a particular orientation, or, in other words, not "backwards".

Various configurations for thrust washers have been proposed to provide a thrust bearing assembly that can be installed only with the proper orientation, not "backwards". Such configurations include tapered sleeves, beveled protrusions and lip extensions formed on the axially directed portions of one of the thrust washers to prevent "backward" installation. However, those configurations add cost to the thrust bearing assembly, or to the housing, and often limit the amount of lubricant that flows radially, between the thrust washers, to lubricate the rolling elements.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a thrust bearing assembly comprising a first thrust washer having an axially extending lip for mating with a cylindrical pilot surface of a housing and a radially extending portion extending from the axially extending lip. A second thrust washer has an axially extending lip and a radially extending portion extending from the axially extending lip to provide at least one tab extending radially outwardly beyond the axially extending lip of the first thrust washer. A remaining perimeter portion of the radially extending portion has a maximum radius less than the radius of the axially extending lip of the first thrust washer. Rolling elements, in rolling contact with the radially extending portions of the first and second thrust washers, are positioned between the axially extending lips of the first and second thrust washers, and retention means retains the first and second thrust washers and the rolling elements together as an assembly.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
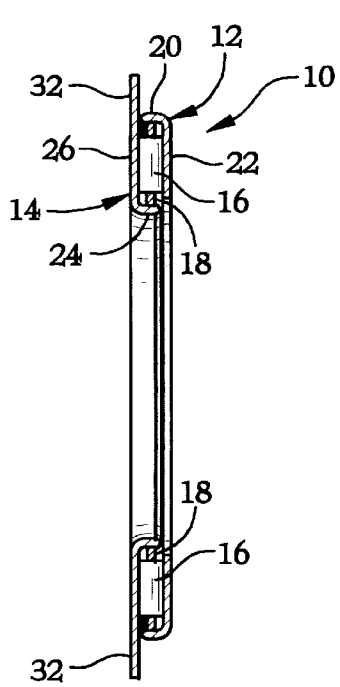
FIG. 1 is a cross sectional view of a thrust bearing assembly with misassembly tabs illustrating the present invention.
Figure 2:
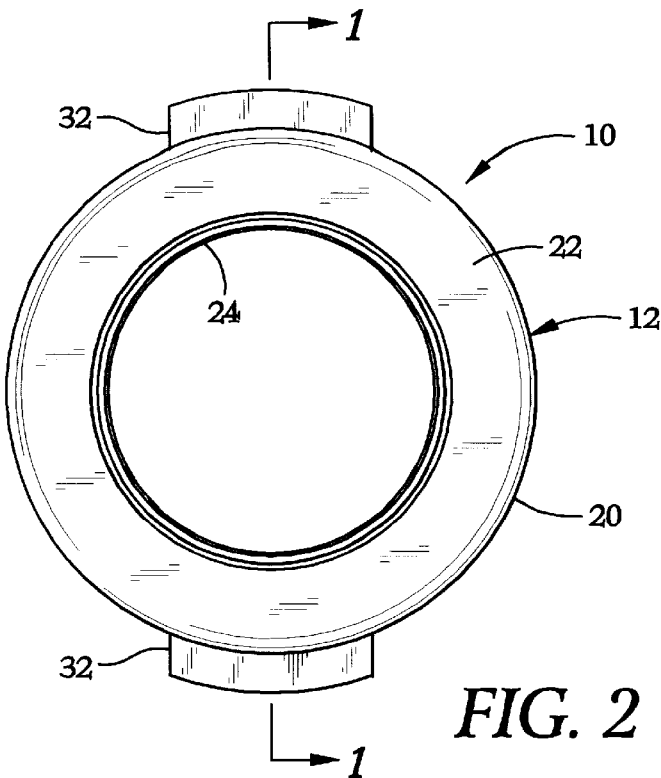
FIG. 2 is an end view of the thrust bearing assembly of FIG. 1, with the line 1—1 indicating FIG. 1.

Referring now to the drawings, FIGS. 1 and 2 illustrate thrust bearing assembly 10 having first thrust washer 12, second thrust washer 14, rolling elements 16, and cage 18. The first thrust washer 12 has an axially extending lip 20 and a radially extending portion 22 at one axial end of the thrust bearing assembly 10 such that first thrust washer 12, in cross-section, forms the letter "J" or "L".

The second thrust washer 14 has an axially extending lip 24 and a radially extending portion 26, at the other axial end of the thrust bearing assembly 10, extending from the axially extending lip 24. The rolling elements 16 are positioned between the first and second thrust washers 12 and 14 such that the rolling elements are in rolling contact with the radially extending portions 22 and 26 and are between the axially extending lips 20 and 24. The rolling elements 16 are retained and guided in cage 18. Cage 18 may be a simple box cage formed of sheetmetal with windows for the rolling elements 16 or may be formed of polymer or other material and may be of various configurations.

Thrust bearing assembly 10 may be held together as an assembly by various methods. In the embodiment illustrated, the axially extending lips 20 and 24 are formed into a 360 degree curl at locations 28 and 30, wrapping loosely around the cage 18 so that the thrust bearing assembly 10 is held together as an assembly while allowing relative rotation of the cage 18 with respect to the axially extending lips 20 and 24. Alternatively, tabs or staking may be used, at discrete locations about the circumference, to prevent axial separation of the two thrust washers from the cage.

The second thrust washer 14 extends radially outwardly beyond the axially extending lip 20 of the first thrust washer 12 to form at least one tab 32, in the same plane as radially extending portion 26. Tab 32 may be at a single location along the circumference of radially extending portion 26, at two locations spaced at 180 degrees as in the illustrated embodiment, or at any number of locations distributed (at regular or irregular intervals) along the circumference. Tab 32 does not require an arcuate perimeter as illustrated, can be smaller than illustrated, and can be any convenient shape and size as long as the tab (or tabs) prevents "backward" installation of thrust bearing assembly 10, as discussed below.

Figure 3:
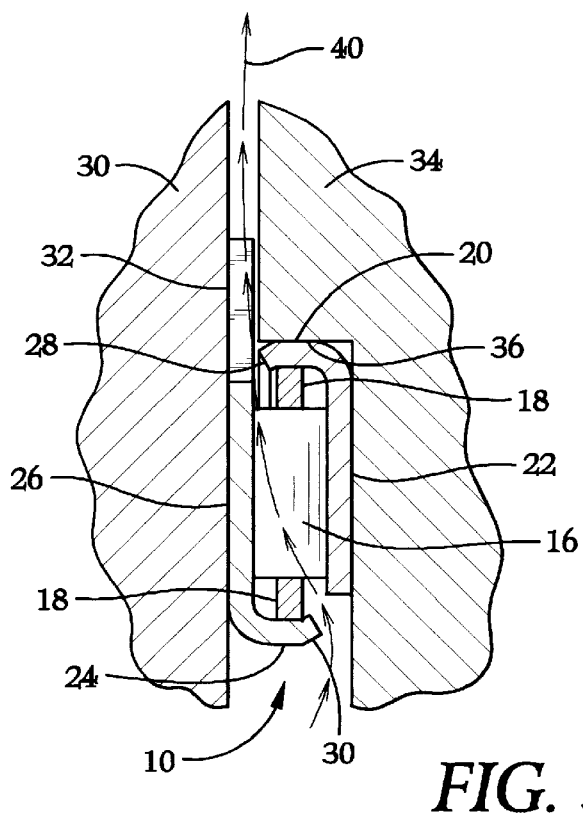
FIG. 3 is an enlarged cross sectional view of the thrust bearing assembly of FIG. 1, taken adjacent a misassembly tab and including portions of a housing and a relatively rotatable member.

FIG. 3 illustrates thrust bearing assembly 10 installed between a housing 34, having a bore 36 (pilot surface) for receiving axially extending lip 20, and a relatively rotatable member 38. Because tab 32 extends radially outwardly beyond axially extending lip 20, the only orientation in which thrust bearing assembly 10 can be installed in bore 26 is with radially extending surface 22 facing the housing 34 and with radially extending surface 26 facing away from the housing 34. In practice, member 38 may be stationary and housing 34 may be rotatable to define this relative rotation, or both elements may be rotating (or rotatable) at different speeds.

Significantly, tab 32 does not extend along the full circumference of thrust washer 14. The remaining perimeter portion of thrust washer 14 has a maximum radius less than the maximum radius of axially extending lip 20, thus facilitating the flow of lubricant between the first and second thrust washers 12 and 14, along the rolling elements 16, and between the housing 34 and the radially extending portion 26, around the tab 32. This results in a substantial advantage over many prior art thrust bearing assemblies with anti-reversal devices.

The one-way misassembly tab located on the outer diameter of the inner lipped thrust washer 14 provides interference with the housing 34 and prevents the second thrust washer 14 from being installed in bore 36, thereby preventing the thrust washer assembly 10 from being installed "backwards". A feature of this design is that it provides enhanced flow of lubricant by allowing lubricant to readily pass between the outer diameter of the bearing assembly 10 and the housing 34, as indicated by the reference numeral 40.

The drawing figures illustrate a cylindrical pilot surface that faces radially inwardly, namely bore 18, against which the outer lipped thrust washer 12 is to be positioned. However, alternatively, the present invention may be used with a cylindrical pilot surface that faces radially outwardly and receives an inner thrust washer. The cross sectional view of this alternative configuration would be similar to FIG. 3; the principal difference would be the location of the centerline of the various elements.

Having described the invention, what is claimed is:

1. A thrust bearing assembly for mounting in a housing having a cylindrical pilot surface, the thrust bearing assembly comprising:

a first thrust washer having an axially extending lip for mating with the cylindrical pilot surface of the housing and having a radially extending portion extending from the axially extending lip;

a second thrust washer having an axially extending lip and a radially extending portion extending from the axially extending lip to provide at least one tab extending radially outwardly beyond the axially extending lip of the first thrust washer to facilitate proper installation of the thrust bearing assembly into the housing, a remaining perimeter portion of the radially extending portion having a maximum radius less than the radius of the axially extending lip of the first thrust washer to facilitate flow of lubricant between the housing and the second thrust washer;

a plurality of rolling elements in rolling contact with the radially extending portions of the first and second thrust washers, between the axially extending lips of the first and second thrust washers; and retention means for retaining the first and second thrust washers and the rolling elements together as an assembly.

2. The thrust bearing assembly according to claim 1, further comprising a cage nin which the rolling elemnts are guided and retained, and wherein the retention means includes a mechanical engagement of the cage by the first and second thrust washers to limit axial movement of the first and second thrust washers in a direction away from the cage.

3. The thrust bearing assembly according to claim 1, wherein the cylindrical pilot surface faces radially inwardly, thereby providing a bore.

4. The thrust bearing assembly according to claim 1, wherein the cylindrical pilot surface faces radially outwardly.

5. The thrust bearing assembly according to claim 1, wherein the number of tabs is at least two and the tabs are distributed evenly about the circumference of the second thrust washer.

6. The thrust bearing assembly according to claim 1, wherein the tabs have an arcuate configuration.

* * * * *